United States Patent
Humele

(10) Patent No.: US 6,520,318 B1
(45) Date of Patent: Feb. 18, 2003

(54) DEVICE FOR INTRODUCING AND/OR ELIMINATING CONTAINERS

(75) Inventor: Heinz Humele, Neutraubling (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 09/720,067

(22) PCT Filed: May 10, 2000

(86) PCT No.: PCT/EP00/04155
§ 371 (c)(1),
(2), (4) Date: Dec. 19, 2000

(87) PCT Pub. No.: WO00/71447
PCT Pub. Date: Nov. 30, 2000

(30) Foreign Application Priority Data

May 19, 1999 (DE) .......................... 199 22 873

(51) Int. Cl.⁷ .............................................. B65G 47/84
(52) U.S. Cl. ................................ 198/483.1; 198/470.1; 198/482.1
(58) Field of Search ............................ 198/470.1, 482.1, 198/483.1

(56) References Cited

U.S. PATENT DOCUMENTS

| | | | |
|---|---|---|---|
| 1,766,018 A | | 6/1930 | Flook |
| 2,374,326 A | * | 4/1945 | Bourland ................. 198/483.1 |
| 3,802,547 A | * | 4/1974 | Wagers, Jr. et al. ........ 198/210 |
| 4,388,989 A | * | 6/1983 | Edmunds et al. ........... 198/345 |
| 5,246,098 A | * | 9/1993 | Boldrini et al. .......... 198/482.1 |
| 5,275,275 A | * | 1/1994 | Boldrini et al. .......... 198/482.1 |
| 5,439,095 A | * | 8/1995 | Lentz et al. ............. 198/480.1 |
| 5,558,200 A | | 9/1996 | Whitby et al. |
| 6,112,881 A | * | 9/2000 | Osti et al. ................ 198/483.1 |
| 6,354,427 B1 | | 3/2002 | Pickel et al. ............. 198/470.1 |

FOREIGN PATENT DOCUMENTS

| | | |
|---|---|---|
| EP | 0 228 351 | 12/2000 |
| WO | WO/40531 | 9/1998 |

* cited by examiner

Primary Examiner—Douglas Hess
(74) Attorney, Agent, or Firm—Marshall, Gerstein & Borun

(57) ABSTRACT

An installation (V) for the introduction and the removal of plastic bottles into or out of a treatment room, which is provided with a drivable lock rotor (4), with lock chambers (3), external and internal star wheel pairs (17, 20; 18, 19), and, in the lock chambers and at the star wheels, gripping and holding devices (6, 24) for the containers, which work in cooperation for the transfer of the containers, and a container discharge area (C) is provided, between the star wheels (17, 20; 18, 19) which are separated in the circumferential direction of the lock rotor (4), for each pair on the circumference of the lock rotor (4), and at least one ejection element (D) is used which can be adjusted from a rest position into a position for ejection of a container into the lock chamber (3), in order to remove containers which remain in an unscheduled manner in the lock chambers, for the purpose of preventing damage.

20 Claims, 3 Drawing Sheets

DEVICE FOR INTRODUCING AND/OR ELIMINATING CONTAINERS

FIELD OF THE INVENTION

Background of the Invention

Figure 1:
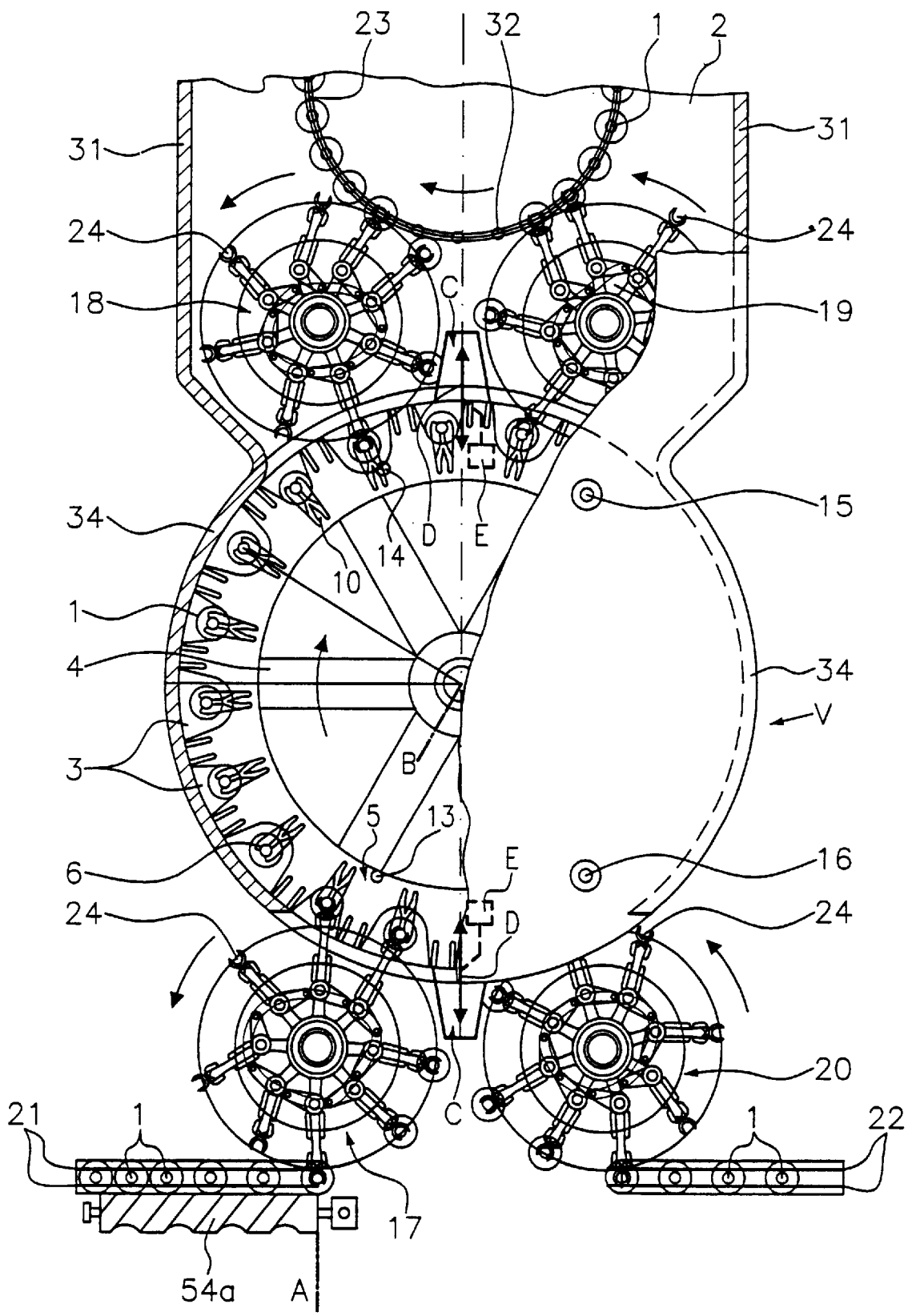

Such installations are used, according to WO 98/40531, for example, to introduce plastic bottles, such as PET bottles, into a treatment room, where they are coated to improve the barrier properties. In order to maintain control over the container during the introduction, during the passage through the lock rotor and during the removal, and, to always keep the container in a correct position (including for the protection of the container surface), and for reasons pertaining to process reliability, clamps are used which work in cooperation. Process reliability is an extremely important factor, because a disturbance resulting from a bottle which has assumed an incorrect position or has become released, requires the stoppage of the operation of the installation, the breaking of the low pressure, and the switching off of the installations in the treatment room, and it requires a longer stoppage time which means high costs. In some cases, all the containers have to be removed from the treatment room, before the installation and the treatment station can be started again. Although the use of the clamps should already result in a relatively high process reliability, one can not avoid, precisely in the case of a lock rotor having, for example, more than twenty lock chambers, that the process of the transfer of a container from a star wheel to the lock rotor or from the lock rotor to a star wheel does not succeed, and one container remains in a lock chamber, which must be empty for the introduction of a new container. In that case, a disturbance in the course of operation cannot be avoided.

Furthermore, from U.S. Pat. No. 1,766,018 it is known, in the case of a lock rotor pair each having only six lock chambers for containers that are to be closed in a vacuum, to provide a ram which is arranged diametrically in each/ lock rotor. Each ram engages, with its ends, into diametrically opposite lock chambers, and it is actuated in such a manner (by the vacuum, an entering container, or a drive), that it pushes a container to be transferred out of the lock chamber. If, under unfavorable circumstances, the container to be pushed out remains in its lock chamber, an exceedingly difficult to correct disturbance occurs, which causes damages, because there is no possibility to remove the container which remained in position in an unscheduled manner.

SUMMARY OF THE PRESENT INVENTION

The invention is based on the task of producing an installation of the above-mentioned type, where operating disturbances caused by containers which remain in position in an unscheduled manner can be reliably avoided.

The core of the invention consists in incorporating, in spite of the "reliable" controlled transfer and the continuous positioning of the container by the gripping and holding devices, an additional device in the installation, which removes the container from the lock chamber, in the theoretically unlikely case, which in practice can, however, not be ruled out, namely where a container remains in an unscheduled manner in a lock chamber; this occurs, in particular, in cooperation with the discharge area which is provided on purpose, so that it is not only possible to remove every remaining container from the lock rotor, it also feasible to do this in such a manner that no further operating disturbances can be caused. The multiple safety features in the container conveyance considerably increase the process reliability, in cooperation with the internal and external discharge areas; moreover, this goal is achieved at justifiable construction costs.

In principle, two variants are advantageous here. The ejection element is either positioned outside of the lock rotor and close to the discharge area, and it is introduced from the outside into the lock chamber for insertion, or the ejection element is placed inside, in the lock rotor, and it is adjusted from inside into the position of ejection into the lock chamber. In the first case, only one ejection element at least is required in each discharge area. In the second case, at least one ejection element is required for each lock chamber.

Advantageously, the ejection element with an adjustment device is arranged, separately from the star wheels of the pair and the lock rotor, in the discharge area, in such a manner that no collisions with these components of the installation can occur.

Alternately, an ejection element, which is secured in an adjustable position in the lock rotor, is provided in the lock rotor for each lock chamber. To activate the ejection element, two construction variants are advantageous. If each ejection element is associated with its own adjustment device which follows the lock rotor, the construction costs are higher, however, the control technological costs may be lower. In the other case, each discharge area is associated with only one adjustment device which is assigned jointly to all the ejection elements. In this case, the construction costs are lower.

An alternate embodiment which is easy to construct, safe in its operation and takes little space, uses rams which are associated with the lock chambers, and which are maintained by spring force in the rest position, and then adjusted into the ejection position, once they have reached a discharge area.

Advantageously, each ram is guided in a guide in the lock rotor, which allows linear adjustment, where the guide should be designed so it provides a pressure seal in view of the fact that in the treatment room the pressure is higher or lower than atmospheric pressure.

In a simple alternate embodiment, each adjustment device consists of a curved track which is in stationary position, and which is directed to the given discharge area, and in which the rams arrive in succession, and are adjusted into their ejection positions. The spring force is responsible for returning the ram to its original position. To prevent wear, the rams can be equipped with rollers, balls or glide cushions.

A particularly advantageous alternate embodiment has an adjustment device, which is in a working connection with a sensor, which activates the adjustment device if a container remained in position in an unscheduled manner, and the adjustment device conveys, by means of the ram, the container into the discharge area. For this purpose, an actuator is used, advantageously a pneumatic cylinder, which is controlled by a magnetic valve, and which adjusts the ram, either directly, or preferably over a movable curved track, into the ejection position.

Because the lock rotor rotates at considerable speed, it is advantageous to place the sensor outside of the lock rotor and before, or at the beginning of, the discharge area. To avoid the need for a disadvantageous modification of the design of the lock rotor, it is advantageous to attach the adjust device to a stationary foundation plate.

In a simple alternative, the ejection element is a following swivel secured lever, which is adjusted into the ejection position by means of stationary curved tracks or cam surfaces.

To prevent containers, which remained in position in an unscheduled manner and which were ejected to prevent damage, from causing subsequent damage, it is advantageous to provide a container collection device or a sorting device in each discharge area.

Advantageously, each ejection element is arranged under the gripping and holding devices, specifically at a height which guarantees a rapid and reliable ejection.

To allow sufficient time, even in the case of a rapidly rotating lock rotor, for the ejection of a container which remained in place in an unscheduled manner, it is advantageous to separate the star wheels of each pair in the circumferential direction of the lock rotor more than is conventionally done under normal conditions.

Figure 2:
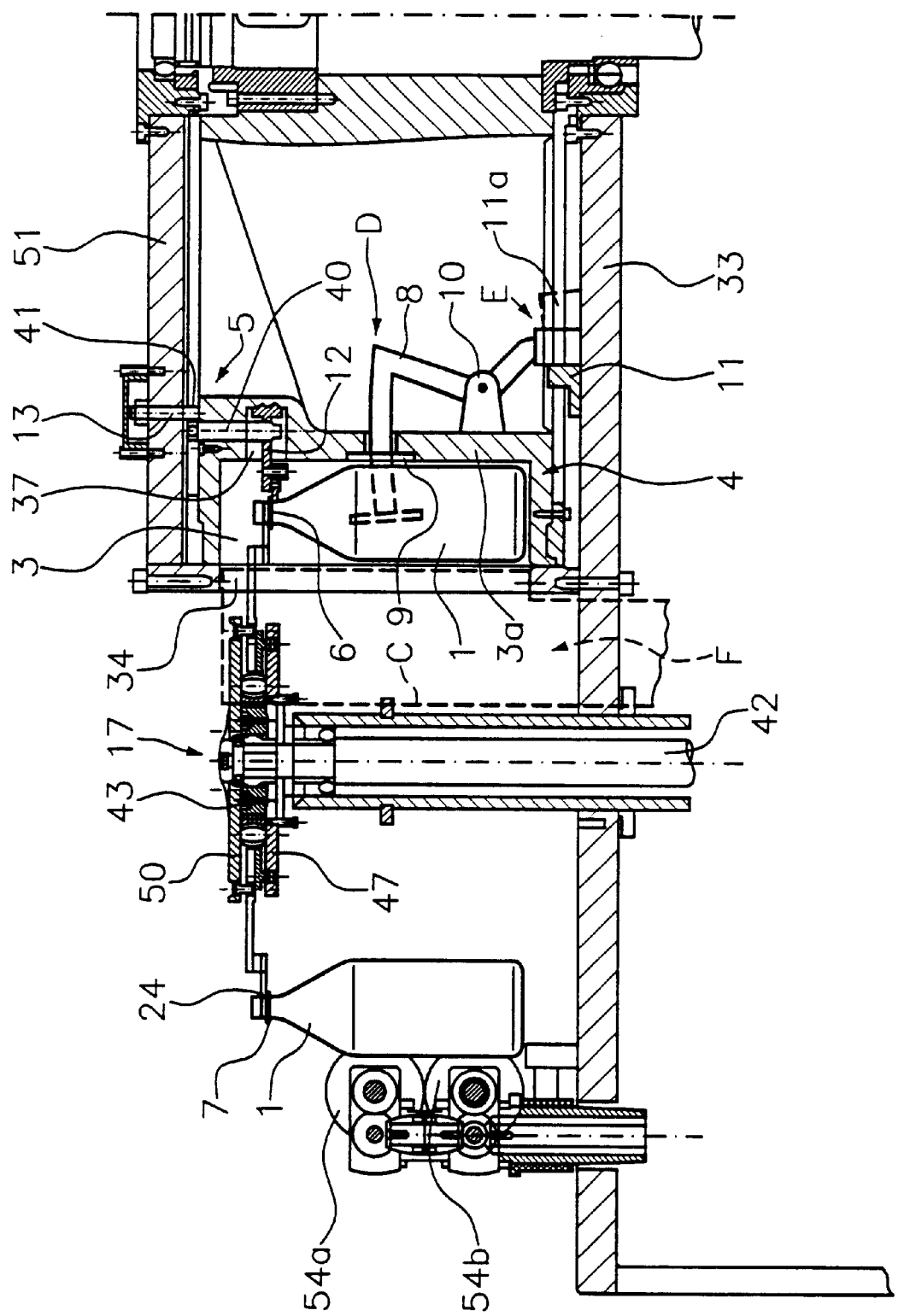
Figure 3:
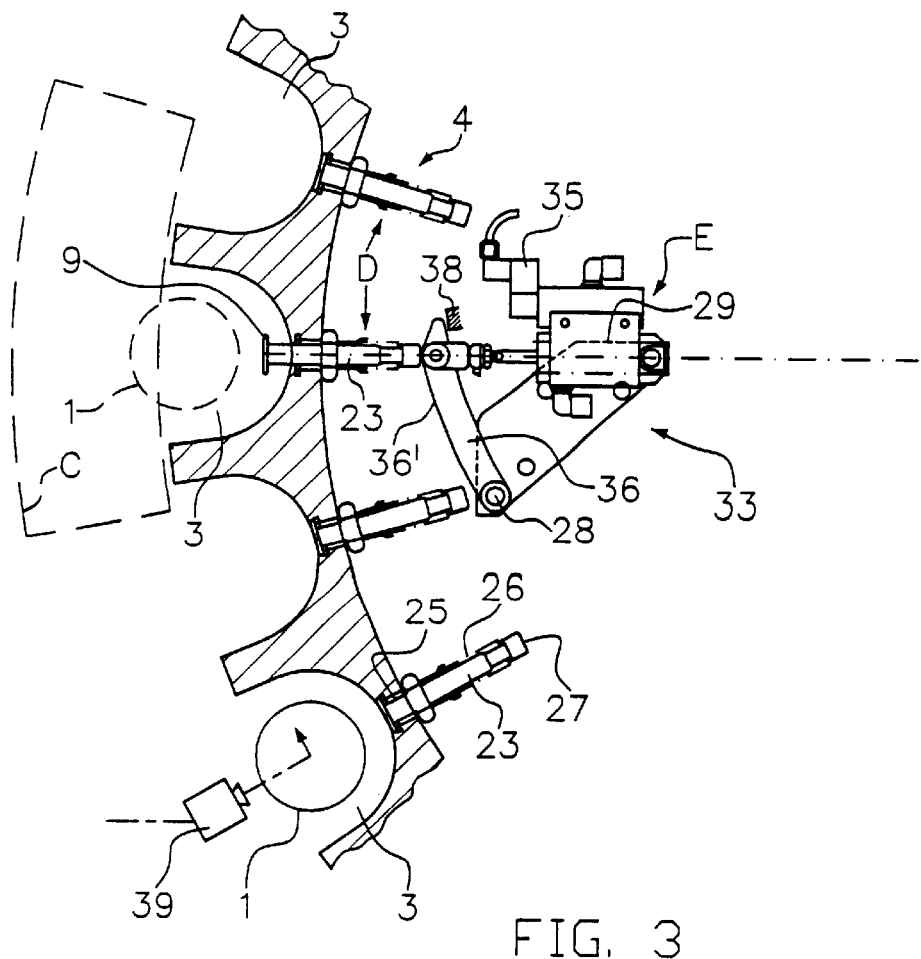
Figure 4:
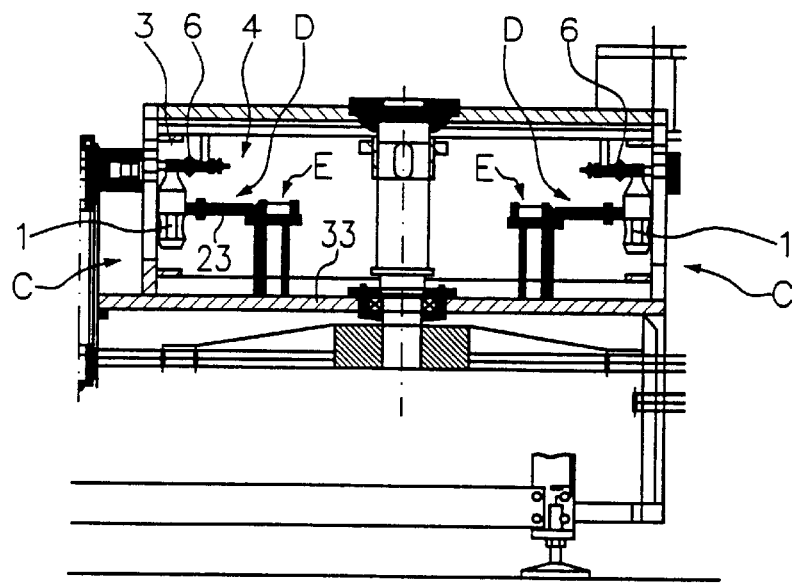

Embodiments of the invention are explained with reference to the following drawings the drawings show:

FIG. 1, a top view, with partial cross section of an installation for the continuous introduction and removal of container into or out of a treatment room, FIG. 2, a cross section of a modified embodiment variant, along the line A-B of FIG. 1, FIG. 3, a horizontal cross section through a lock rotor in another modified embodiment variant, and FIG. 4, a diagrammatic vertical cross section of the lock rotor in the modified embodiment of FIG. 3.

DETAILED DESCRIPTION OF THE PREFERRED EMBODIMENT

An installation V in FIGS. 1 and 2 is used for the introduction and the removal of containers 1, for example, plastic bottles, such as reusable PET bottles, into or out of an evacuated treatment room 2, for example, in which the containers 1, for example, are coated to increase their barrier properties. In the treatment room 2, which is closed off by walls 31, a conveyor 23 with spikes 32 which can be inserted into the openings of the containers 1 is provided, which advances the containers past coating devices which are not shown.

The installation V has (FIG. 2) a horizontal foundation plate 33, on which are provided a lock rotor 4 and two pairs of star wheels 17, 20; 18, 9 (internal and external star wheel pairs, with reference to the treatment room 2) which work in cooperation with the lock rotor 4.

The external star wheel 17 takes over the container 1 from a supply conveyor 21, in whose end area, introduction worms 54a, 54b are provided. In this end area, clamp-like gripping and holding devices 24 of the star wheel 17 are snapped onto the container 1. Then, each container 1 is introduced into the lock rotor 4, in which it is transferred to a controlled, grip-like gripping and holding device 6. The lock rotor 4 is provided, on its external circumference, with lock chambers 3 which open outward, each containing a gripping and holding device 6. The containers 1 have, for example (FIG. 2), a neck collar 7 and a thread. The clam-like gripping and holding devices 24 grab the containers 1 above the neck collar 7, while the grip-like gripping and holding devices 6 in the lock chambers 3 grab below the neck collar 7. This guarantees a problem free transfer of the containers.

The star wheels 17, 18, 19, 20 have essentially the same construction and each is equipped with clamp-like gripping and holding devices 24.

The clamp-like gripping and holding devices 24 of the star wheel 18 (the internal star wheel) arranged in the treatment room 2 take over the containers from the grip-like gripping and holding devices 6 in the lock chambers 3 and they transfer the containers to the spikes 23 of the conveyor 32. The other star wheel 19 (also an internal star wheel) arranged in the treatment room 2, takes over the treated containers 1 from the spikes 23, and transfers them to the grip-like gripping and holding devices 6 in the lock chambers 3, by means of which the containers 1 are conveyed to the external star wheel 20, and transferred to the latter's clamp-like gripping and holding devices 24.

By means of drives, not shown, arranged below the foundation plate 33, the lock rotor 4 and the star wheels 17 to 20 are driven synchronously with respect to each other and synchronously with respect to the conveyor 23 in the direction of the arrow. The lock chambers 3, which are closed with a gas-proof seal, have dimensions which are such that they are only slightly larger than the largest container 1 to be conveyed. The lock walls 34 become the walls 31 of the treatment room 2. On the topside, a cover plate 51 is provided. The lock chambers 3 can be connected, in the area of the lock walls 34, with pipes for the introduction and/or the evacuation of gas.

With the grip-like gripping and holding device 6 in each lock chamber 3, a container 1 is centered and fixed during the transport in the lock rotor 4; this is advantageously achieved by suspension, without floor support and without contact with the walls 3a of the lock chambers. Each gripping and holding device 6 is located in a support plate 12, which is attached in a recess 37 of the lock chamber 3 in a separable and gas-proof manner. In the hold position, the gripping and holding device 6 grabs the neck of the container over more than 180° and with friction-type lock, so that the container 1 is held with friction-type and positive lock. The control of the opening and closing movements of the gripping and holding devices 6 occurs at the desired places of the circular path of the lock rotor 4 with a control device which acts, for example, on control cams 10 provided in the gripping and holding devices 6. Each control cam 10 is attached to a cam shaft 40 which is rotatably secured in parallel to the lock rotor axis, and which projects upward. At the projecting end, a control lever 41 is attached, which, in each case, works in cooperation with one of four stationary bolt-like abutments 13, 14, 15, 16 which are attached in the cover plate 51 and which jut into the circular path of the control levers 41.

Since the construction of the star wheels 17 to 20 is essentially the same, only the star wheel 17 is explained. A horizontal plate 43 is attached to a vertical drive axle 42, to which rectangular levels are pivotably secured, which act in cooperation, via curve rollers, with a grooved curve 47 arranged in a fixed position below the plate 43, which grooved curve controls a swinging motion of the clamp-like gripping and holding devices 24 during the rotating movement of the plate 43. Slides arranged on the rectangular levers work, via curve rollers, in cooperation with a second grooved curve 50, which is arranged in a fixed position above the plate 43 and which controls a radial movement of the gripping and holding devices 24. The gripping and holding devices 24 grab the container 1 over more than 180°, so that no floor support is required during the conveyance of the containers 1. While the grip-like gripping and holding devices 6 are force controlled by their control device 5, each clamp-like gripping and holding device 24 is opened by means of the container 1 itself, which spreads open the gripping and holding device 24 and penetrates until it snaps on, and which is then held by friction-type force. It is only after the grabbing of the container 1 by the grip-like gripping and holding device 6 in the lock chamber 3, that the container 1 is again released with appreciable resistance. At the time of the transfer of a container 1 from the gripping and holding device 6 to the gripping and holding device 24 of the star wheel 18, the gripping and holding device 6 is opened under control, as soon as the container 1 has snapped into the gripping and holding device 24, according to schedule. The gripping and holding device 24 of the star wheel 19 pulls the container 1 off the spike 32, as soon as the container is snapped on, according to schedule, and later it transfers this container to the gripping and holding device 6, as soon as it was closed under control. To transfer the container to a gripping and holding device 24 of the star wheel 20, the gripping and holding device 6 in question is opened under control, as soon as the container has snapped into the gripping and holding device 24, according to schedule. The removal conveyor 22, finally, pulls the container 1 out of the gripping and holding device 24 of the star wheel 20.

According to FIG. 1, a container discharge area C is provided between each external star wheel pair 17, 20 and each internal star wheel pair 18, 19, where it is advantageous for the two star wheels of each pair to be separated more than normally, in the circumferential direction of the lock rotor 4, in order to discharge a container 1 which has remained in a lock chamber 3 in an unscheduled manner, for the purpose of preventing damage, and to allow it to be removed. For the ejection of such a container 1, an ejection element D is provided, which is in working connection with an adjustment device E, which ejection element D can be adjusted from a rest position, in which it does not engage into the lock chambers 3, to a position for ejection into the lock chamber 3.

FIG. 1 is merely a diagrammatic representation by means of a double arrow of the ejection element D, and of the adjustment device E.

There are several possibilities to effectively incorporate the ejection elements D, which are activated only in the discharge areas C, with their adjustment devices E, in the installation V.

In the first case (not illustrated), the ejection element D with its adjustment device E is located outside of the lock rotor 4 in or near the discharge area C, where it can be driven by the adjustment device E in such a manner that it can be introduced, from the rest position outside of the lock chamber, into a position for ejection into the lock chamber, where it conveys the container 1 which has remained therein into the discharge area C.

In the other case (FIGS. 2 to 4), each lock chamber 3 is associated with at least one ejection element D specific to it, which is either adjusted each time into the ejection position when the associated lock chamber 3 enters the discharge area C, or only if a container 1 has remained in an unscheduled manner in the lock chamber 3, which container in fact should have been removed by the gripping and holding device 24 from the lock chamber 3.

In an alternate embodiment which is not shown, each ejection element D of a lock chamber 3 could work in cooperation with its own adjustment device, which turns, like the ejection element D, with the lock rotor 4.

However, preference is given to an embodiment variant (FIGS. 2 to 4), in which, for each discharge area C, only one adjustment device E is provided, which is shared by all the ejection elements D, in particular in a fixed position inside the lock rotor 4 on the foundation plate 33 (or optionally on the cover plate 51). Each adjustment device E is directed in a direction which approximately matches the angular position of the associated discharge area C.

In FIG. 2, the ejection element D is a swinging lever 8, which is secured in a swinging bearing S on a lock chamber wall 3a and which engages with a discharge plate 9 in the lock chamber 2. The other or free activation end of the lever 8 works in cooperation with a guide track or cam surface 11 which is attached in a fixed manner to the foundation plate 33. The guide track or cam surface 11 has a section 11a, which adjusts the lever 8, by means of a spring which is not shown, from the rest position represented in full lines, into the ejection position represented in broken lines, namely at the time when the associated lock chamber 3 starts to penetrate into the discharge area C. Moreover, a container collecting device or container sorting device F can be provided in the discharge area C.

Accordingly, in the circular motion of the lock rotor 4, each lever 8 is adjusted twice, for preventive purposes, from the rest position into the ejection position which is shown in broken lines, independently of whether the lock chamber 2 contains a container 1 which has remained in position in an unscheduled manner, or not.

In the alternate embodiment in FIG. 3, the ejection elements D associated with the lock chambers 3 are implemented in the form of rams 23 which can be moved in a linear motion, where each one is led in an advantageously gas-proof guide 25 in the lock chamber wall 3a. A spring 26 ensures the retracted rest position of the ram 23, which is directed with its activation end 27 toward a curved track 36, 36' secured on the foundation plate 33, where the position of the curved track corresponds to the discharge area C.

In a manner similar to the continuously actuated embodiment variant in FIG. 2, the curved track 36' can be supported, for example, at 28 and 38, in such a manner that each ram 23, at the time it passes the curved track 36', is adjusted for preventive purposes in the indicated discharge position, and then it conveys a container 1 (shown in broken lines) which remains in position in an unscheduled manner, into the discharge area C.

In the second variant, shown in FIG. 3, the ram 23 associated with a lock chamber 3 is adjusted from its rest position against the force of the spring 26 into the ejection position only if there is in fact a container 1 remaining in the lock chamber in an unscheduled manner. For this purpose, the adjustment device E is equipped with an actuator 29, which adjusts the curved track 36 around the support 28 designed as a swiveling axis into the position represented in full lines. The support 38 is then not present. The actuator 29 is, for example, a pneumatic cylinder, supplied via a magnetic valve 35 with pressurized air, which is reset due to spring force, as soon as the application of pressurized air is interrupted. A sensor 39 is positioned outside of the lock rotor 4, in the direction of rotation before or at the beginning of the discharge area C, which sensor senses the passing lock chamber successively for the presence of a container 1 which has remained in position in an unscheduled manner. If the sensor 39 detects, by its position, the container 1, drawn in full lines, in the lock chamber 3, then, via a connection between the sensor 39 and the magnetic valve 35, the actuator 29 is actuated, which brings the curved track 36 in the position represented in full lines, so that this container 1 (indicated in broken lines) is then conveyed into the discharge area C.

FIG. 4 shows, in an axial cross section of the lock rotor 4, the arrangement of the ejection elements D, for example, the rams 23 of FIG. 3, and of its adjustment devices E, which are attached via consoles to the foundation plate 33. The ejection elements E are located under the gripping and holding devices 6 of the lock chambers 3 and at a height at which they convey the containers 1 swiftly and essentially parallel to themselves out of the lock chambers 3 into the given discharge area C. The grip-like gripping and holding elements 6 of the lock rotor 4 are normally opened by the stationary abutment 16 or 14, respectively, so that they do not impede the discharge of the container in the discharge area C.

The sensor 30 can also be arranged on the star wheel 18 or 20, where it actuates the actuator, in the case of the detection of an empty clamp-like gripping and holding element 24, for the purpose of ejecting the bottle 1 which has not been grabbed, and which caused the vacancy.

I claim:

1. An installation (V) for the continuous introduction and/or removal of containers (1) into or out of a treatment room (2), comprising in combination at least one drivable lock rotor (4), which has, on its external circumference, lock chambers (3) which open outward; with at least one following star wheel pair (17, 20; 18, 19), placed on the external circumference of said lock rotor, where said star wheels are separated from each other in the circumferential direction of said lock rotor; and with gripping and holding devices (6, 24), working in cooperation, for the containers, which said gripping and holding devices are arranged in said lock chambers (3) and on said star wheels (17, 18, 19, 20), and, on the external circumference of said lock rotor (4), between said star wheels (17, 20; 18, 19) of at least one pair, a container discharge area (C) is provided, and for each said discharge area (C) at least one ejection element (D) is provided which can be adjusted from a rest position into a position for ejection of a container into said lock chamber (3).

2. The installation according to claim 1, wherein a given said ejection element (D) can be moved, either from an interior of said lock rotor (4) or from the external circumference of said lock rotor (4) into the container ejection position which grabs one of the containers (1) located in said lock chamber (3).

3. The installation according to claim 1, and wherein a said ejection element (D) with an adjustment device (E) is arranged in said discharge area (C), separated from said star wheels (17, 18, 19, 20) and said lock rotor (4).

4. The installation according to claim 3, wherein each said lock chamber (3) is associated with a said ejection element (D) which follows in said lock rotor (4) and which is secured in an adjustable manner, and in that, in said lock rotor (4), in each case a fixed said adjustment device (E), directed onto said discharge area (C), is provided, either specifically for each said ejection element (D) or for all said ejection elements (D).

5. The installation according to claim 4, wherein said ejection element (D), associated with a given said lock chamber (3), is a ram (23), which is set in a rest position by spring force (26) and which is approximately radial with respect to the axis of said lock rotor.

6. The installation according to claim 5, wherein said ram (23) is guided in a guide (25) in said lock rotor (4) in such a manner that it can be moved in a straight line.

7. The installation according to claim 5, wherein said adjustment device (E) has a curved track (36') which is secured in a fixed position, and which engages in the circular path of the free ends of all said rams (23) located in their rest positions.

8. The installation according to claim 6, wherein said ram is guided in a guide in said lock rotor in a lock chamber partition wall.

9. The installation according to claim 3, wherein said adjustment device (E) has a curved track (36) which can be adjusted from a passive position into an engagement position at the free end of a ram (23), and an actuator (29) in a working connection with a sensor (39).

10. The installation according to claim 9, wherein said sensor (39) is arranged outside of said lock rotor (4) on said star wheel (18, 20) which takes over the container (1) from said lock rotor, and with said sensor each said gripping and holding device (24) of said star wheel (18, 20) can be sensed for the absence of a container (1).

11. The installation according to claim 9, wherein said sensor (39), outside of said lock rotor (4), is arranged in an advanced position with respect to an angular position of said curved track (36), in the direction of rotation of said rotor, in, or in an area adjacent to, said discharge area (C), and by means of said sensor, each said lock chamber (3) can be sensed for the presence of a container (1).

12. The installation according to claim 9, and wherein said ram is a pneumatic cylinder which can be controlled by means of a magnetic valve (35).

13. The installation according to claim 3, wherein each said adjustment device (E) is secured on a stationary foundation plate (33) of said lock rotor (4).

14. The installation according to claim 1, wherein each said ejection element (D) in said lock rotor (4) is arranged almost under said gripping and holding devices (6, 24).

15. The installation according to claim 1, wherein the dimension of each said discharge area (C), in the circumferential direction of said lock rotor (4), is a multiple of the width of said lock chamber.

16. The installation according to claim 1, wherein, in the treatment room (2), a low pressure exists, and in said treatment room, a container discharge area (C) is arranged, where the ejected containers (1) remain at least temporarily in said low pressure treatment room (2).

17. The installation according to claim 1, wherein a container collection device or container sorting device (F) is provided in each said discharge area (C).

18. The installation according to claim 1, wherein said ejection element (D) is a following, swinging secured lever (8) in said lock rotor (4), said lever being directed with one activation end toward fixed secured curved tracks (11, 11a) or cam surfaces, which in turn are directed in the interior of said lock rotor (4) onto said discharge areas (C).

19. The installation of claim 13, wherein said secured lever is a rectangular lever with a discharge plate arranged in said lock chamber.

20. The installation according to claim 1, where said containers are plastic bottles.

* * * * *

UNITED STATES PATENT AND TRADEMARK OFFICE
CERTIFICATE OF CORRECTION

PATENT NO.   : 6,520,318 B1
DATED        : February 18, 2003
INVENTOR(S)  : Heinz Humele It is certified that error appears in the above-identified patent and that said Letters Patent is hereby corrected as shown below:

Column 8,
Line 53, please delete "13" and insert -- 18 --.

Signed and Sealed this

Twenty-third Day of December, 2003

JAMES E. ROGAN
*Director of the United States Patent and Trademark Office*